United States Patent
Bradway et al.

(10) Patent No.: US 9,498,960 B2
(45) Date of Patent: Nov. 22, 2016

(54) PASSIVE ACTUATORS FOR PRINTHEAD CLEANING USING MOBILE MAINTENANCE CARTS

(71) Applicant: Xerox Corporation, Norwalk, CT (US)

(72) Inventors: Jeffrey J. Bradway, Rochester, NY (US); Matthew D. Savoy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/693,124

(22) Filed: Apr. 22, 2015

(65) Prior Publication Data

US 2016/0311226 A1    Oct. 27, 2016

(51) Int. Cl.
*B41J 2/165*    (2006.01)
*B33Y 30/00*    (2015.01)

(52) U.S. Cl.
CPC ............ *B41J 2/16544* (2013.01); *B33Y 30/00* (2014.12)

(58) Field of Classification Search
CPC ........................... B41J 2/16544; B33Y 30/00
See application file for complete search history.

(56) References Cited

U.S. PATENT DOCUMENTS

| | | | |
|---|---|---|---|
| 2,765,547 A | 10/1956 | Dimmel et al. | |
| 2,944,275 A | 7/1960 | Markusen | |
| 5,904,100 A | 5/1999 | Findley et al. | |
| 6,191,507 B1 | 2/2001 | Peltier et al. | |
| 6,688,021 B2 | 2/2004 | Baig et al. | |
| 7,070,250 B2 | 7/2006 | Lester et al. | |
| 7,481,513 B2 * | 1/2009 | Hsieh | B41J 2/16544 347/33 |
| 8,167,395 B2 * | 5/2012 | Fienup | B29C 67/0059 347/14 |
| 8,288,004 B2 | 10/2012 | Moorlag et al. | |
| 8,692,011 B2 | 4/2014 | Moorlag et al. | |
| 8,851,664 B2 | 10/2014 | Spence | |
| 2003/0035019 A1 * | 2/2003 | Dietl | B41J 2/16547 347/33 |
| 2011/0125307 A1 | 5/2011 | Dickson et al. | |
| 2012/0157277 A1 | 6/2012 | Moorlag et al. | |
| 2013/0293652 A1 | 11/2013 | Spence et al. | |
| 2013/0293653 A1 | 11/2013 | Spence et al. | |
| 2014/0125749 A1 * | 5/2014 | Spence | B41J 2/215 347/104 |

FOREIGN PATENT DOCUMENTS

EP    2 474 418 B1    7/2012

* cited by examiner

*Primary Examiner* — Julian Huffman
*Assistant Examiner* — Michael Konczal
(74) *Attorney, Agent, or Firm* — Maginot Moore & Beck LLP (57) ABSTRACT

A maintenance system for a three-dimensional object printer includes a platform having a plurality of wheels that enable the platform to move along a first track, and having a maintenance mechanism connected to the platform so as to be movable normal to the first track. The maintenance mechanism includes a lifting member that extends laterally from the platform, and a maintenance tool configured to move with the lifting member. A lifting platform is positioned laterally offset from a location of the first track where an ejector head is positioned opposite the first track, and is configured to engage with the lifting member to lift the maintenance tool and enable the maintenance tool to perform a maintenance operation on the ejector head.

17 Claims, 11 Drawing Sheets

PASSIVE ACTUATORS FOR PRINTHEAD CLEANING USING MOBILE MAINTENANCE CARTS

TECHNICAL FIELD

This disclosure relates generally to three-dimensional printing systems, and in particular, to ejector head maintenance devices used in three-dimensional object printing systems.

BACKGROUND

Digital three-dimensional object manufacturing, also known as digital additive object manufacturing, is a process of making a three-dimensional solid object of virtually any shape from a digital model. Three-dimensional object printing is an additive process in which one or more ejector heads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to a different source of material to enable all of the ejectors in an ejector head to eject drops of the same material. Materials that become part of the object being produced are called build materials, while materials that are used to provide structural support for object formation, but are later removed from the object, are known as support materials. Three-dimensional object printing is distinguishable from traditional object-forming techniques, which mostly rely on the removal of material from a work piece by a subtractive process, such as cutting or drilling.

Figure 16:
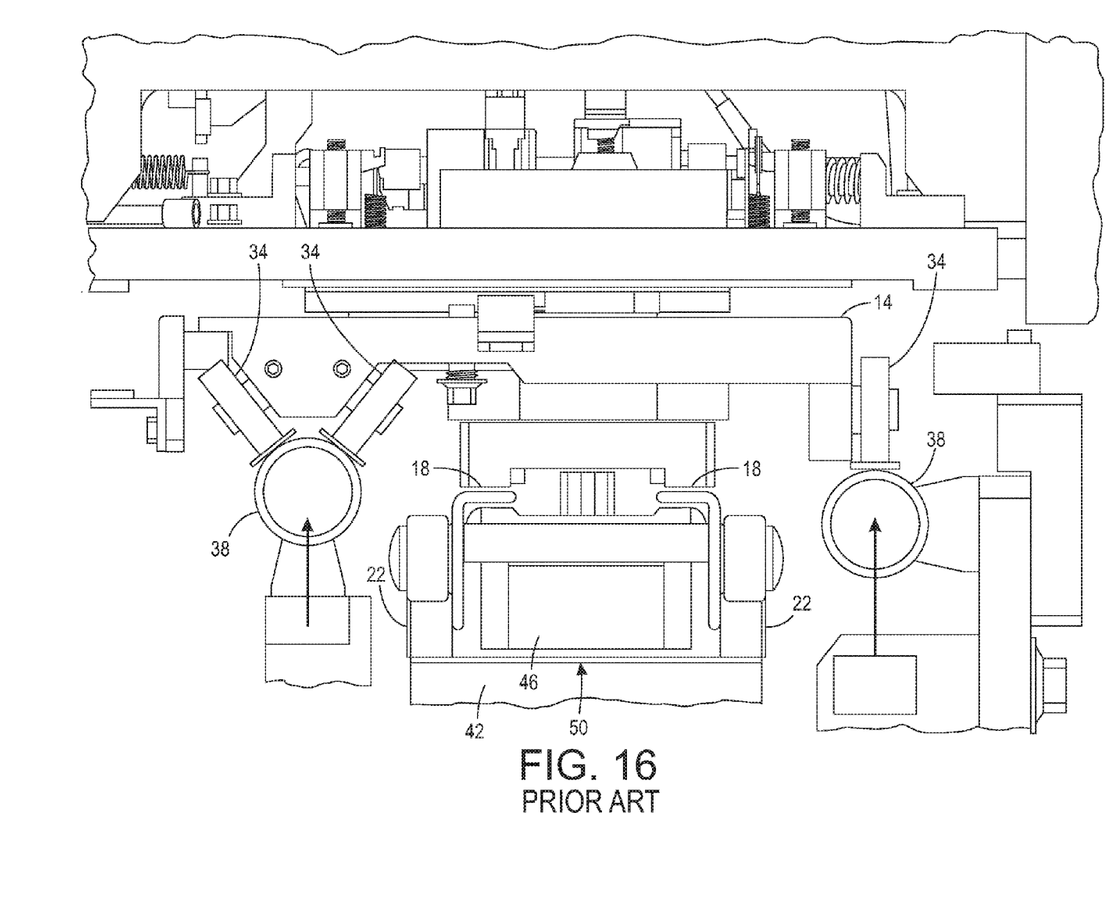
FIG. 16 is an end view of a prior art cart positioned on a track in a printing system.
Figure 17:
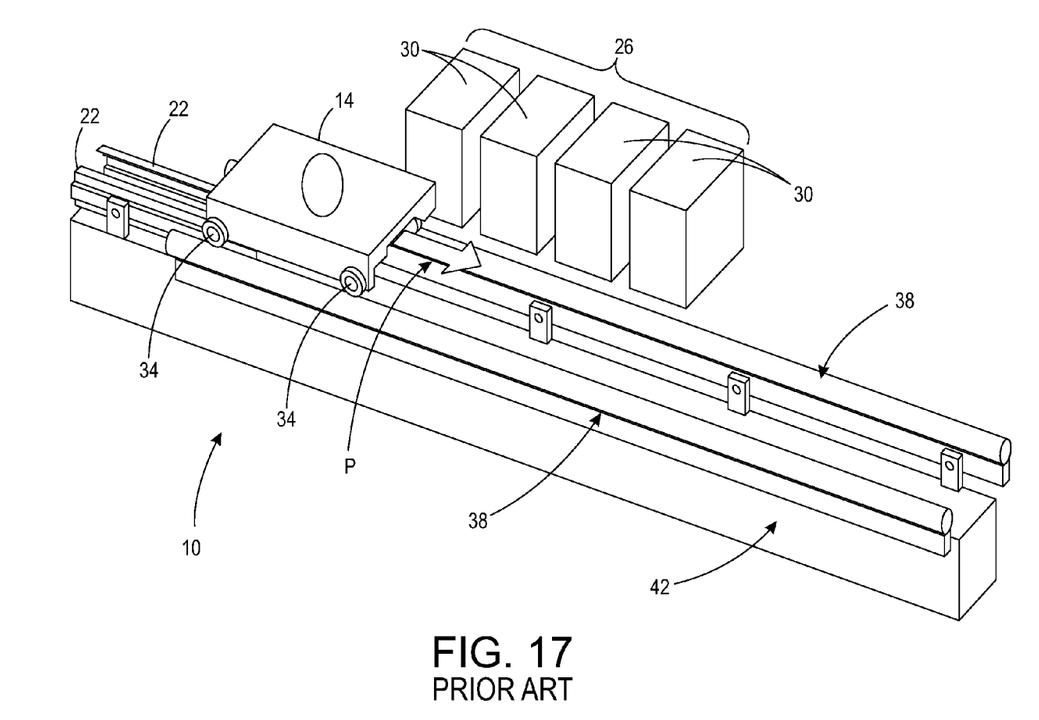
FIG. 17 is a perspective view of a prior art printing system having a mobile cart.

A previously known three-dimensional object printing system 10 is shown in FIG. 17. In the view depicted in that figure, a platform 14, called a cart, includes surfaces 18 (FIG. 16) that slide upon track rails 22 to enable the cart to move in a process direction P between printing stations, such as the printing station 26 shown in FIG. 17. Alternatively, carts can include wheels configured to roll along tracks, or other types of acceptable mobility mechanisms. Printing station 26 includes four ejector heads 30 as shown in the figure, although fewer or more ejector heads can be used in a printing station. Once the cart 14 reaches the printing station, the cart 14 transitions to and moves along precision rails 38 through the printing station. Precision rails 38 are cylindrical rail sections that are manufactured within tight tolerances to help ensure accurate placement and maneuvering of the cart 14 beneath the ejector heads 30. Linear electrical motors are provided within housing 42 to interact with a magnet inside housing 46, which is connected to the lower surface of the cart 14. The motors generate electromagnetic fields that interact with the magnet to propel the cart along the track rails 22 between print stations and along the precision rails 38 within the printing stations. Once the cart 14 is beneath the printing station 26, ejection of material occurs in synchronization with the motion of the cart. Electrical motors (not shown) are operatively connected to a gantry to which the ejector heads are mounted to move the ejector heads in an X-Y plane that is parallel to an upper surface of the cart 14 as layers of material are formed in the object. Additional motors (not shown) move the printing station 26 vertically with respect to the cart 14 as layers of material accumulate to form an object. Alternatively, a mechanism can be provided to move an upper surface of the cart 14 vertically and horizontally for formation of the object. Once the printing to be performed by a printing station is finished, the cart 14 is moved to another printing station for further part formation, layer curing, or other processing.

An end view of the system 10 is shown in FIG. 16. That view depicts in more detail the surfaces 18 that rest upon the rails 22 that extend from and above the electrical motor housing 42. As the motors generate electromagnetic fields that interact with the magnet in housing 46, the surfaces 18 of the cart 14 slide along the track rails 22. At the printing station, the bearings 34 of the cart 14 contact the precision rails 38 in an arrangement that facilitates accurate positioning of the build platen on the cart 14. Specifically, bearings 34 are positioned at a right angle to one another on one of the rails 38 to remove four degrees of freedom of the cart 14, while the other bearing 34 rests on the other rail 38 to remove one more degree of freedom. Gravity and magnetic attraction between the electrical motor and the magnet in the housing 46 hold the bearings 34 in contact with the rails 38.

Material ejected by the ejector heads 30 as well as other contaminants can accumulate and present a risk of damaging or impacting the accuracy of the ejector heads 30. For example, material within an ejector head can solidify to form a clog or partially obstruct the ejector head. Material from other ejector heads or other particulates can contaminate the ejector head. Similar risks are also present for other printing stations in the printing system 10.

Material that has accumulated on an ejector head or other printing station, or extraneous material from an improperly maintained ejector head can present other risks. When carts are not present underneath the ejector heads 30, errant drips of materials can fall from the ejector heads and produce undesired debris and contamination on the precision rails 38, rails 22, and the housing 42. Also, air-borne contaminants in the environment, such as dust or other particulate matter, can fall and collect on the rails 38, rails 22, and the housing 42. When these contaminants and debris are located at any interface between the bearings 34 and the rails 38, or between the surfaces 18 and the rails 22, the linear velocity of the cart is disrupted and the quality of the printed object is affected. Similarly, when these materials are within the gap between the top surface 50 of the housing 42 and the magnet 46, the magnetic attraction can be affected and enable the cart to be less constrained. Additionally, the collection of material drops on top of the housing 42 can also affect the dissipation of heat from the motor and cause motion quality disturbances, impacting the performance and reliability of the motor. In order to produce three-dimensional objects with acceptable quality, the motion of the cart 14 beneath the ejector heads 30 needs to be precise. Therefore, improvements in three-dimensional object printing systems that help prevent the contamination on the precision rails and motor housing that affects the accuracy of the placement and movement of the cart would be beneficial.

Regular maintenance to the ejector heads 30 and other printing stations is beneficial for maintaining accurate and efficient operation of the printing system 10, and for preventing material and other contaminants from accumulating on the precision rails and motor housing. Conventional three-dimensional object printing system maintenance devices often require lengthy interruptions of the printing process, and include complex machinery beyond the components necessary for three-dimensional object printing that can increase the machine footprint of the system. One example of a conventional maintenance device includes a maintenance cabinet separate from the printing system 10 that can be positioned next to a printing station to be maintained. The cabinet contains tools usable to maintain the printing station. In another example, an ejector head is moved to engage with a maintenance station configured to maintain the ejector head. Including a maintenance architecture that does not interrupt the printing process and that does not significantly increase the footprint of the printing system would be beneficial.

SUMMARY

A three-dimensional object printing system with an incorporated maintenance system includes a track, an ejector head positioned opposite a first portion of the track and configured to eject material to form objects, at least one platform that is positioned laterally offset of the first portion of the track and that includes a surface raised by a height above the track, a mobile cart, and a controller.

The mobile cart for maintaining a three-dimensional object printing system includes cart includes a platform, and a mechanism. The platform is configured to move along the track of the printing system. The mechanism includes a member, a tool, and a moving member. The member is movably connected to the platform to enable the member to move in a direction normal to the track. The tool is operatively connected to the member to enable the tool to move with the member. The moving member is operatively connected to the member and extends laterally from the platform in a cross-process direction. The moving member has a surface configured to engage with the at least one platform positioned laterally offset from the first portion of the track to lift the moving member from a resting height up to a height of the at least one platform so the member and tool are raised by a distance equal to the height of the at least one platform to enable the tool to perform an operation.

The controller is configured to move the cart along the track past the first portion to enable the at least one moving member to engage with the at least one platform to lift the tool by the distance equal to the height of the at least one moving platform, and operate the tool to perform the operation.

BRIEF DESCRIPTION OF THE DRAWINGS

The foregoing aspects and other features of the present disclosure are explained in the following description, taken in connection with the accompanying drawings.

DETAILED DESCRIPTION

For a general understanding of the present embodiments, reference is made to the drawings. In the drawings, like reference numerals have been used throughout to designate like elements.

Figure 1:
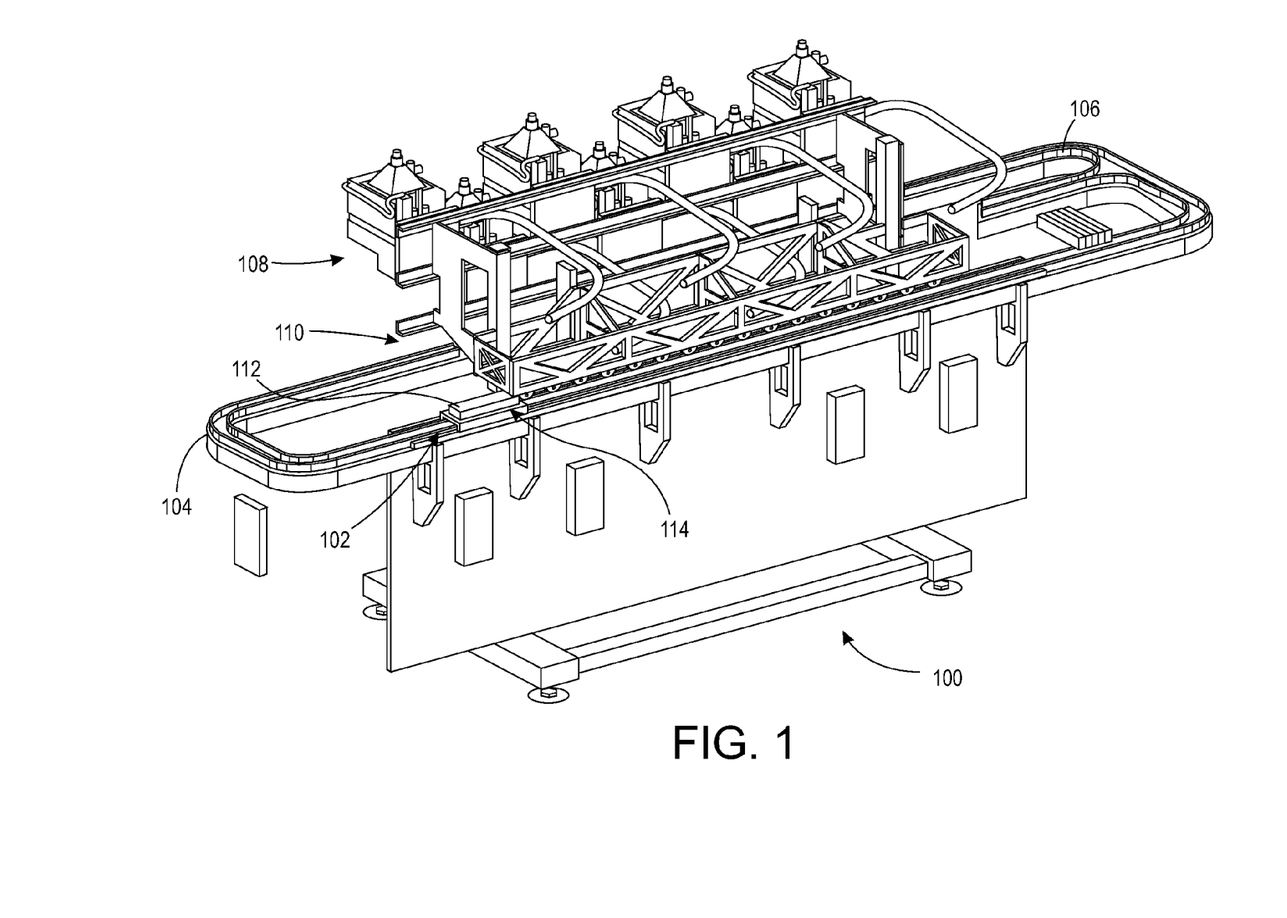
FIG. 1 is a perspective view of an exemplary embodiment of a printing system according to this disclosure.

FIG. 1 illustrates an exemplary embodiment of a three-dimensional object printer 100 that incorporates at least one mobile cart 102. The printer 100 includes a first track 104, a second track 106, and at least one printing station 108 positioned opposite a first portion 110 of the track 104. The mobile cart 102 includes a platform 112 and wheels or sliding surfaces 114, such as the wheels 34 and sliding surfaces 18 discussed above in regard to FIG. 16. The platform 112 is configured to support material for forming a three-dimensional object, while the wheels or surfaces 114 connected to the platform 112 are configured to engage and move along the first track 104.

In general operation, the mobile cart 102 moves along the first track 104 past the printing station 108, which includes at least one ejector head configured to eject material onto the platform 112 of the mobile cart 102 to form a three-dimensional object. The second track 106 is configured to support at least one maintenance cart (not shown), described in further detail below. During a maintenance operation, maintenance carts can be operated to move from the second track 106 to the first track 104 and pass by the ejector heads of the station 108 to perform a maintenance operation on the ejector heads. In other embodiments, the printer does not include a second track, and maintenance carts move along the first track 104 in conjunction with the mobile cart 102.

Ejector heads for three-dimensional object printing systems typically require maintenance over extended use, such as at regular intervals, after a predetermined number of printing operations, or upon detection of a maintenance issue, in order to maintain accuracy, efficiency, and operability necessary for three-dimensional object printing. Ejector heads can become obstructed or clogged with extraneous material, foreign materials can contaminate or damage ejector heads, and material can build up on the track 104 or other portions of the printing system 100 and interfere with the printing operation.

Figure 2:
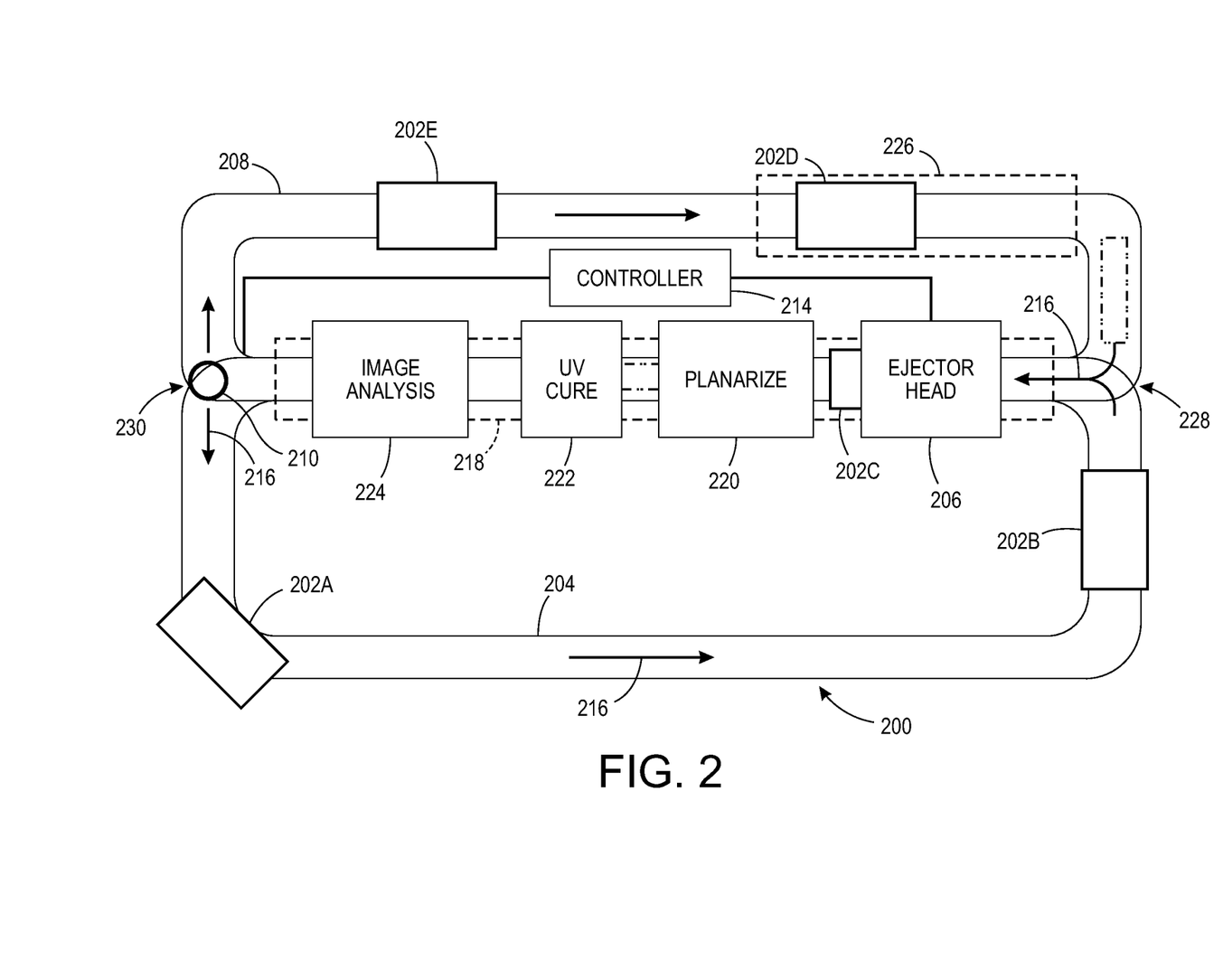
FIG. 2 is a schematic top view of an exemplary of a printing system according to this disclosure.

FIG. 2 illustrates a schematic view of a three-dimensional object printing system 200 that incorporates a maintenance system that coordinates well with the printing process performed by the printing system 200. The system 200 includes at least one platform, such as the platforms 202a-e, a first track 204, an ejector head 206, a second track 208, a switch 210, and a controller 214. In the embodiment of FIG. 2, platforms 202a and 202b are platforms configured with a build platen to support an object being produced by the system, while platforms 202c-202e are maintenance platforms. Each of the platforms 202a-e includes a plurality of wheels (not shown, see, e.g., FIG. 3) that are configured to engage with and roll along the first and second tracks 204, 208 to enable the platforms 202a-e to move through the system 200. The platforms 202a-202e include a magnet within a housing like the one described above with regard to FIG. 17 to enable the linear motors along the tracks 204, 208 to propel the platforms along the tracks. Other types of propulsion systems, such as motors powering the plurality of wheels of a platform, conveyers, or blowers are also contemplated. Other types of mechanisms that enable the platforms to move along the first track 204, such as sliding surfaces, air cushions, or other suitable mechanisms, in addition to or instead of the plurality of wheels. The reader should understand that in the present embodiment, the first track 204 is a continuous loop, and the process direction 216 refers to a direction of motion around the loop which, in FIG. 2, is counter-clockwise.

The ejector head 206 is configured to eject material for forming a three-dimensional object, and is positioned opposite a first portion 218 of the first track 204. As illustrated in FIG. 2, the first portion 218 includes multiple printing stations in addition to the ejector head 206, such as a planarizing station 220, a UV cure station 222, and an image analysis station 224, but other configurations and numbers of printing stations are also contemplated. In one embodiment, at least one printing station is located opposite another portion of the first track 204 spaced apart from the first portion 218. Although illustrated as a single ejector head, the reader should understand that the ejector head 206 can be an array of ejector heads. Moreover, the system 100 can include additional ejector heads or arrays of ejector heads positioned opposite the first track 204.

The controller 214 is operatively connected to the ejector head 206 and is configured to operate the ejector head as the build platforms in platforms 202a-202e move along the first track 204 past the ejector head in the process direction 216. The controller 214 is also operatively connected to other printing stations and is configured to perform other printing operations via the other printing stations. The connections between the controller and the other printing stations 220-224 are not shown in FIG. 2 for the purpose of clarity.

The system 200 includes at least one maintenance platform, such as the platforms 202c-e. Maintenance platforms are operable to perform a maintenance operation on a printing station, such as the ejector head 206, the first or second track 204, or 208, other platforms, or other portions of the printing system 200. In this embodiment, a second portion 226 of the second track 208 is configured to support maintenance platforms to enable a maintenance platform, such as the platform 202d, to remain on the second portion 226 during a time period in which the platform 202d is unused. The second portion 226 can also include maintenance cart stations (not pictured) such as a waste receptacle, charging station, or other stations configured to facilitate use of the maintenance platforms 202c-e. In another embodiment, the printer 200 does not include a second track so the maintenance stations described above are positioned opposite a portion of the first track 204, and the first track 204 also supports the maintenance carts 202c-e when not in use with a printing station.

In the embodiment of FIG. 2, the second track 208 is coupled to the first track 204 at a first position 228 to enable maintenance platforms to move from the second track 208 to the first track 204. The first position 228, on the first track 204, is before the first portion 218 in the process direction 216 such that a maintenance platform moving from the second track 208 to the first track 204 passes by the first portion 218 when continuing to move along the first track 204. When a maintenance platform passes by a printing station, such as the platform 202c passing by the ejector head 206, the controller 214 is further configured to operate the maintenance platform to perform an operation on the printing station, e.g., the ejector head 206. A particular platform can be operable to perform an operation on a particular printing station. In another example, a platform can be operable to perform one or more operations on one or more different printing stations. For instance, the printing system 200 can include different maintenance platforms that are each operable to perform a different maintenance operation.

The first track 204 is selectively coupled to the second track 208 at a second position 230 that is after the first portion 218 in the process direction 216. In the present embodiment, the switch 210 is operable to selectively couple the first and second tracks 204, 208 at the second position 230, but other selective coupling mechanisms are also contemplated. The controller 214 is operatively connected to the switch 210, and is further configured to operate the switch 210 to return maintenance platforms to the second track 208, and to enable build platforms to remain on the first track 204.

As illustrated in FIG. 2, when the second track 208 is coupled with the first track 204, another continuous loop is formed by the second track 208 and the first portion 218 of the first track 204. In the present embodiment, the maintenance platforms 202c-e move along the other continuous loop in a clockwise direction such that both the maintenance platforms 202c-e and the build platforms 202a and 202b move along the first portion 218 in the same direction. While this embodiment includes two continuous loops, other embodiments can include other numbers of continuous loops. In one embodiment, different maintenance platforms, such as platforms operable to perform different operations, are configured to move along different continuous loops. In another embodiment, one or more printing stations or maintenance stations are positioned on a portion of a continuous loop such that other platforms are enabled to move along a different loop while a particular platform engages with the station.

Maintaining the printing stations while minimizing interruptions in the printing process of the system 200 can beneficially enable a steady workflow of printing operations, and a decrease in downtime for printing station upkeep. The maintenance platforms should not collide with other platforms or impede the movement of other platforms. Advantageously, the controller 214 can be further configured to coordinate movement of maintenance platforms 202c-e with the movement of the build platforms 202a and 202b. In other words, the controller 214 can be configured to schedule an operation on a printing station during a period of time when a build platform is not occupying a printing station. For example, the controller 212 can schedule operations at predetermined intervals, after a predetermined number of printing operations, upon detection of a maintenance fault, such as a clog or contamination, or before or after a particular printing operation.

Because the second track 208 is integrated with the first track 204 such that both maintenance platforms 202c-e and build platforms 202a and 202b pass through the first portion 218, a footprint of the printing system 200 is reduced relative to systems having a maintenance station that is separate from the printing stations. Further, the integrated nature of the maintenance platforms 202c-e with the workflow of the printing process eliminates the need to connect and setup a maintenance station, such as a maintenance cabinet, that may need to be individually moved to and configured to operate with each individual printing station.

The printing system 200 according to the disclosure enables performing different operations on different printing stations while eliminating the often time consuming and complicated setup procedures involved in conventional maintenance systems.

In an example of an operation on a printing station, when maintenance platform 202c is positioned opposite the ejector head 216, the controller 214 is configured to operate the ejector head 206 to eject material onto the maintenance platform 202c. Such ejection can purge extraneous material or contaminants from the ejector head 206, remove or prevent a clog, clean material from the ejector head 206, or prevent extraneous material from accumulating on, for example, the first track 204.

Figure 3:
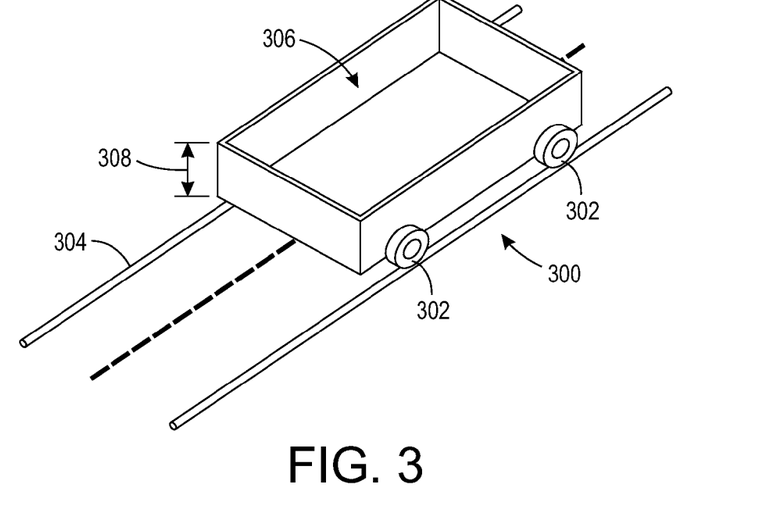
FIG. 3 is a perspective view of an exemplary embodiment of a maintenance cart according to this disclosure.

FIG. 3 illustrates an exemplary embodiment of a maintenance platform 300 that includes a plurality of wheels 302 configured to engage with a track 304, and a tray 306 configured to receive material ejected from an ejector head. The tray 306 has a height 308 configured to retain material ejected therein. In one embodiment, the platform 300 comes to a stop beneath an ejector head to enable the ejector head to purge material into the tray 306. While integrating maintenance platforms with build platforms to perform operations as described above is beneficial to reducing delay in the printing process, purging material from an ejector head may result in a delay before the ejector head is again usable for printing onto a media platform. In another embodiment, the platform 300 remains in motion along the track 304 while the ejector head purges material into the tray 306 as the platform 300 passes by, thereby further reducing or even eliminating the delay. The platform 300 can move along the track 304 at full process speed, or at a reduced rate of speed in order to facilitate the purging of material from the ejector head.

In another example of an operation, wiping a face of a printing station such as the ejector head 206 (FIG. 2) is beneficial to remove extraneous material or contaminants, remove or prevent clogs, and otherwise maintain the printing station. The controller 214 is configured to move a maintenance platform 202c by the ejector head 206 and operate the maintenance platform 202c to wipe a face of the ejector head 206, for example, via a wiping mechanism.

Figure 4:
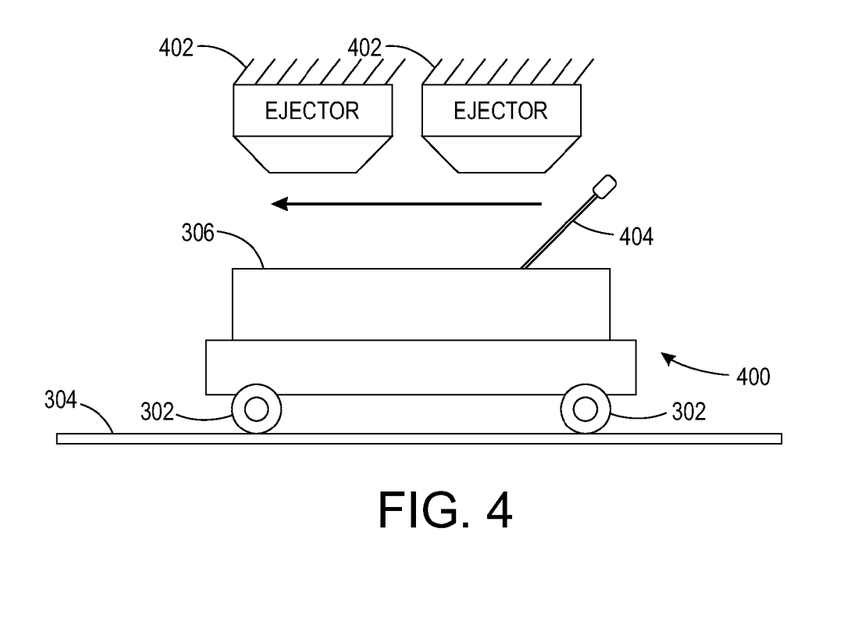
FIGS. 4 and 5 are side schematic views of different exemplary embodiments of maintenance carts with wipers according to this disclosure.

FIG. 4 illustrates an exemplary embodiment of a maintenance platform 400 that is operable to wipe an ejector 402. The platform 400 includes wheels 302 configured to engage with a track 304, and a wiper 404 connected to the platform 400. The wiper 404 is positioned and configured to wipe the ejector 402 when the platform 400 is moved along the track 304 to the ejector 402. The wiper 404, in this embodiment, is a rigid wiper that wipes as the platform 400 moves. Other types of wipers are also contemplated, as described in further detail below.

Performing different operations in sequence or in conjunction can be beneficial. In this embodiment, the platform 400 further includes a tray 306, and the wiper 404 is connected to the tray 306. In one example, performing a material purging operation to purge material from the ejector 402 before performing a wiping operation is beneficial because extraneous material does not impact the ejector 402 during the wiping operation, and the wiper 404 is positioned so the tray 306 passes by the ejector 402 before the wiper 404. Both purging and wiping the ejector 402 enables the ejector 402 to be both ready to operate efficiently and to be free from extraneous material.

Because the wiper 404 is a rigid wiper, any face of the printing stations that is positioned to contact the wiper 404 is wiped as the platform 300 passes by the printing station.

In some cases, wiping a printing station is undesirable even though the printing station is positioned at a location at which it would come into contact with the wiper. Additionally, selectively wiping a particular printing station or particular an ejector head, rather than, for example, wiping every printing station or every ejector head in the printing system, can be beneficial. Not all ejector heads may require wiping at the same time, and only wiping a selected ejector head(s) can reduce the time needed to perform the operation, or reduce a risk of damaging an ejector head. In one embodiment, a wiper on a maintenance platform is configured to wipe a particular printing station or ejector head and is not optimized for wiping other printing stations or ejector heads in the printer.

Figure 5:
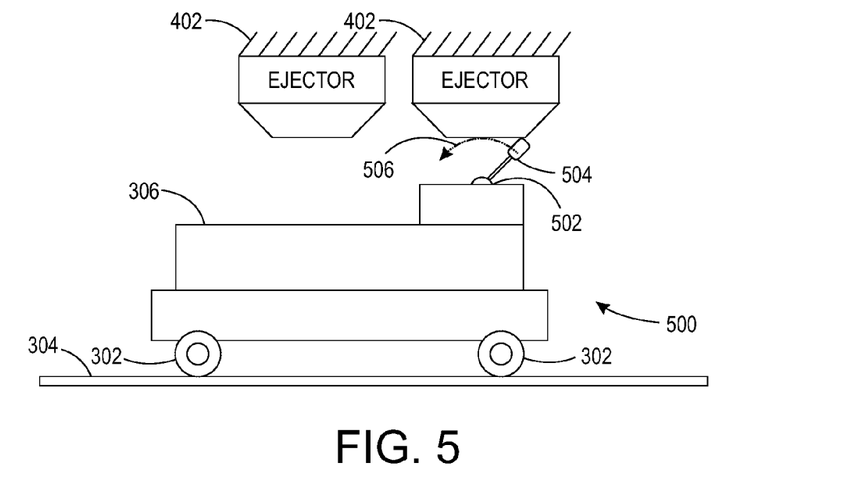

In one embodiment, illustrated in FIG. 5, the wiper 504 includes an actuator 502 operable to move the wiper 504 in a wiping motion 506 and to move the wiper 504 to a position that enables the platform 500 to pass by the station without the wiper coming into contact with the ejector 402. The platform 500 can be stationary while the actuator 502 moves the wiper 504, or it can be moving along the track 304. However, including the actuator 502 on the platform 500 can limit a size of the tray 306. Controlling the actuator 502 to accurately locate the wiper 504 in relation to printing stations may also be complicated, and may result in significant increases in the time needed to perform maintenance operations.

Figure 6:
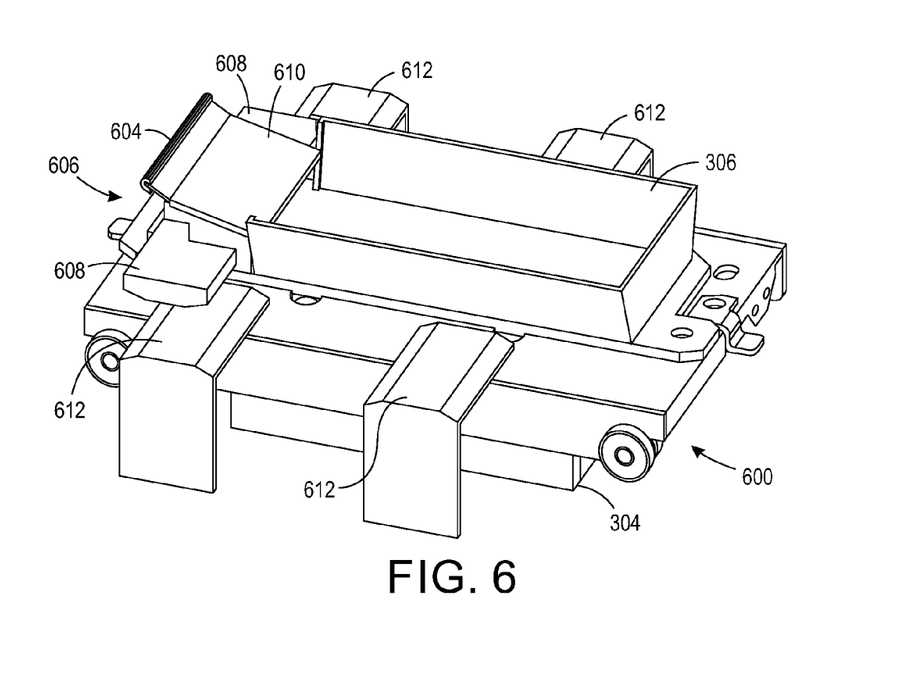
FIG. 6 is a perspective view of an exemplary embodiment of passive actuators for a maintenance cart according to this disclosure.
Figure 7:
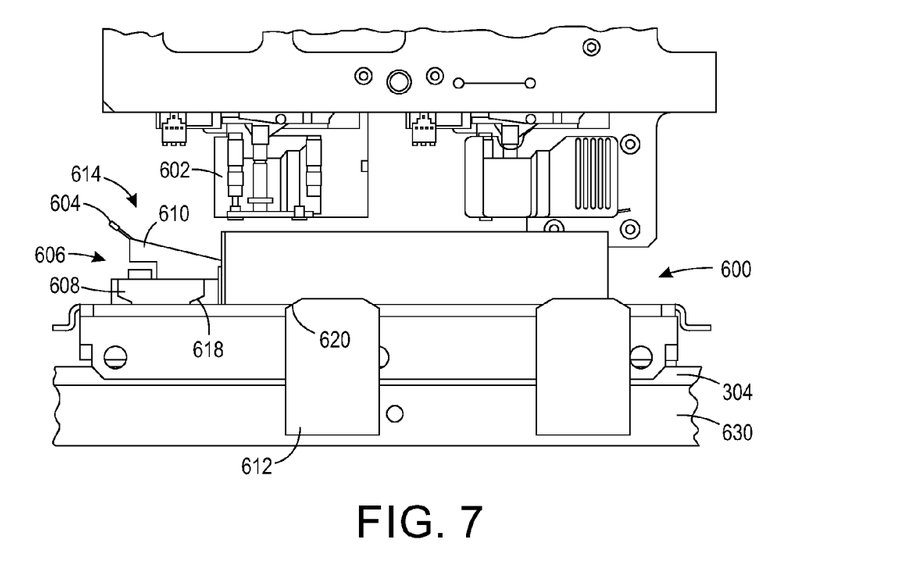
FIG. 7 is a side view of the passive actuators of FIG. 6 in a lowered position.
Figure 8:
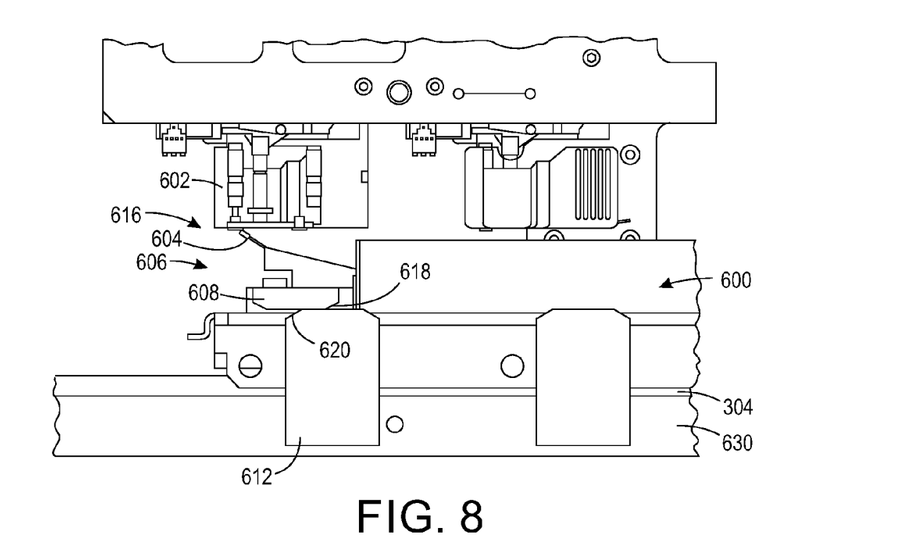
FIG. 8 is a side view of the passive actuators of FIG. 6 in a raised position.
Figure 9:
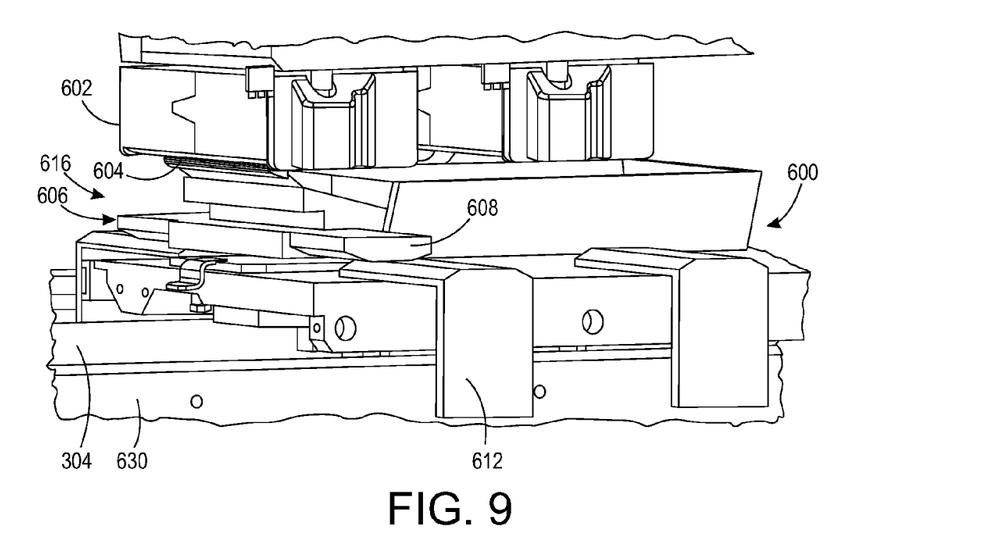
FIG. 9 is a perspective view of the passive actuators as illustrated in FIG. 8.

FIG. 6 illustrates another exemplary embodiment of a platform 600 that includes a wiper 604 configured to be actuated via passive actuators, and FIGS. 7-9 illustrate the platform 600 positioned at an ejector head 602 for performing an operation. In this embodiment, the wiper 604 is mounted onto the platform 600 via a wiper holder 606 that includes lift wings 608 and a tray ramp 610. Lift guides 612 are positioned along the track 304. The wiper holder 606 is configured to move normally with respect to the platform 600. In one embodiment, the wiper holder 606 is connected to the platform 600 via a spring, slider, or other type of connection that enables vertical translation. Gravity acts to move the wiper holder 606 towards a lowered position 614, as shown in FIG. 7. In an embodiment, the wiper holder 606 further includes a compression member (not shown) configured to hold the wiper holder 606 in the lowered position 614 unless a threshold amount of force is applied. The tray ramp 610 is configured to guide material wiped from the ejector head 602 into the tray 306 of the platform 600. In one embodiment, the tray ramp 610 is omitted, and the wiper holder 606 engages with a rear side of the tray 306.

The lift wings 608 extend laterally from each side of the platform 600, and are configured to engage with the lift guides 612 to enable the wiper holder 606 to move to a raised position 616 as shown in FIGS. 8 and 9. Advantageously, the lift wings 608 and lift guides 612 include complementary angled transition surfaces 618 and 620 respectively, which enable a smooth transition between the raised position 616 and the lowered position 614. Other types of transition surfaces, such as curved surfaces, are also contemplated. In one example, the lift wings and/or the lift guides include rollers configured to transition the wiper holder 606 between positions. In one embodiment, the lift guide and/or lift wings include surfaces shaped to move the wiper 604 in a wiping motion when the platform 600 passes by the lift guides.

Figure 10:
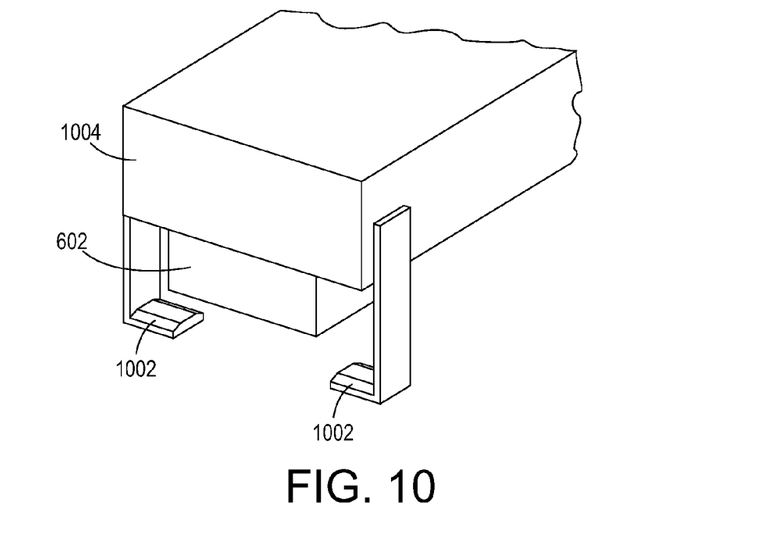
FIGS. 10 and 11 are perspective views of different exemplary embodiments of passive actuators according to this disclosure.

When the wiper holder 606 is in the raised position 616, the wiper 604 is in a position that enables the wiper 604 to wipe the ejector head 602 as the platform 600 continues to move along the track 304. Further, when no lift guides are present along the track 304, the wiper holder 606 remains at the lowered position 614 so the wiper is in a position that enables the platform 600 to continue to move along the track 304 without wiping the ejector head 602. Although FIGS. 6-9 illustrate the lift guides 612 as being positioned on top of the track 304 and extending downwards to be mounted on, for example, a housing 630 of the track 304 (FIGS. 8 and 9), FIG. 10 illustrates another embodiment of lift guides 1002 that are mounted to a gantry 1004 that also houses the ejector head 602.

Figure 11:
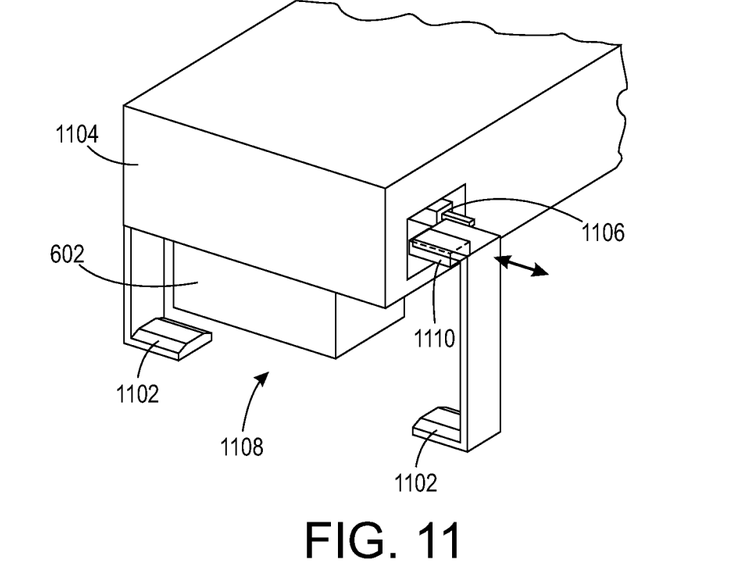

Selectively positioning lift guides along the track enables selective wiping of ejector heads. FIG. 11 illustrates an embodiment where the lift guides 1102 are mounted to the gantry 1104 via an actuator 1106. The actuator 1106 is configured to laterally move the lift guides 1102, perpendicularly to the process direction 1108 along a slide 1110, to enable the lift guides 1102 to move between a first position where the lift guides 1102 are configured to engage the lift wings 608 (FIG. 6) and a second position where the lift guides 1102 do not engage the lift wings 608.

Figure 12:
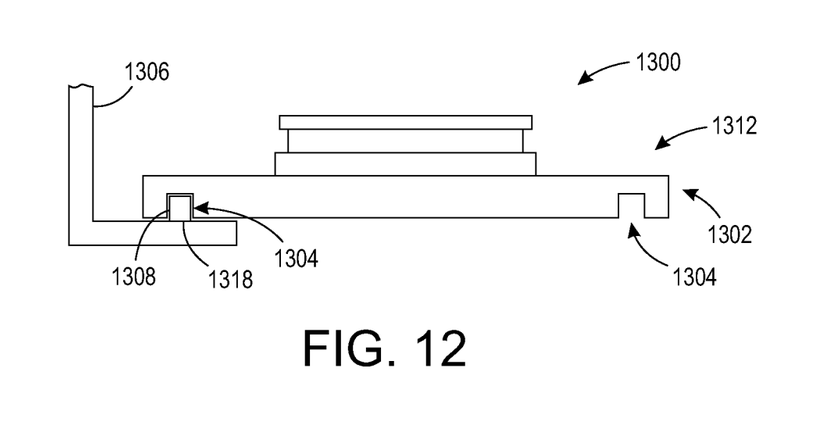
FIGS. 12 and 13 are front views of different exemplary embodiments of passive actuators according to this disclosure.
Figure 13:
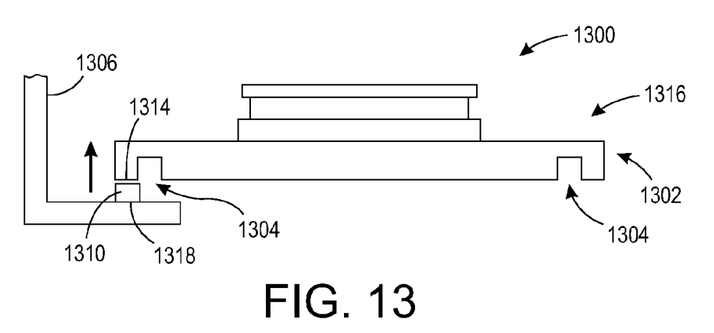

FIGS. 12 and 13 illustrate another exemplary embodiment of a passive actuator that enables selective wiping of ejector heads. The platform 1300 in FIGS. 12 and 13 includes a wiper holder 1302 that has a lifter key-slot 1304. FIG. 12 illustrates a lift guide 1306 that includes a key-tab 1308 that is complementary to the key slot 1304, and FIG. 13 illustrates a lift guide 1316 that includes a key-tab 1310 that is not complementary to the key-slot 1304.

When, as illustrated in FIG. 12, the key-tab 1308 and key-slot 1304 are complementary, the key-tab 1308 fits within the key-slot 1304 while the platform 1300 moves, and the wiper holder 1302 remains in a lowered position 1312. When, as illustrated in FIG. 13, the key-tab 1310 and key-slot 1304 are not complementary, a bottom surface 1314 of the wiper holder 1302 engages with the key-tab 1310 to enable the wiper holder 1302 to move to a raised position 1316. In an example, the key-tab 1310 includes a sloped transition surface 1318 that enables a smooth transition between the lowered position 1312 and the raised position 1316.

In one embodiment, lift guides 1306 that include key slots can be laterally repositioned, such as by the actuator 1106 (FIG. 11), so that the key-tab is selectively complementary to the key-slot 1304. In other words, by moving the lift guide 1306 so that the key tab moves into or out of alignment with the key-slot 1304, the lift guide enables selectively moving the wiper holder to the raised position 1316. In another embodiment, different wipers on the same platform, or different wipers on different platforms, are respectively configured to wipe a particular ejector head. Lift guides proximate to each ejector head can include a key-tab configured to engage with the bottom surface of a particular wiper holder that is mounted with the wiper that corresponds with that ejector head. This configuration enables operation of each wiper only for its corresponding ejector head. Other types of actuators are also contemplated, including active actuators positioned along the track that are configured to actuate lift wings of a wiper holder and that are controlled via the controller.

In a further example of an operation, covering an ejector head during a period of time in which the ejector head is unused can be beneficial to protect the ejector head from damage and contamination, and to inhibit material within the ejector head from solidifying and potentially forming clogs. In another example, some types of materials ejected by an ejector head, such as UV curing material, can be volatile or dangerous, and covering the ejector head during periods of nonuse to limit the exposure of such materials to the environment can be beneficial.

Figure 14:
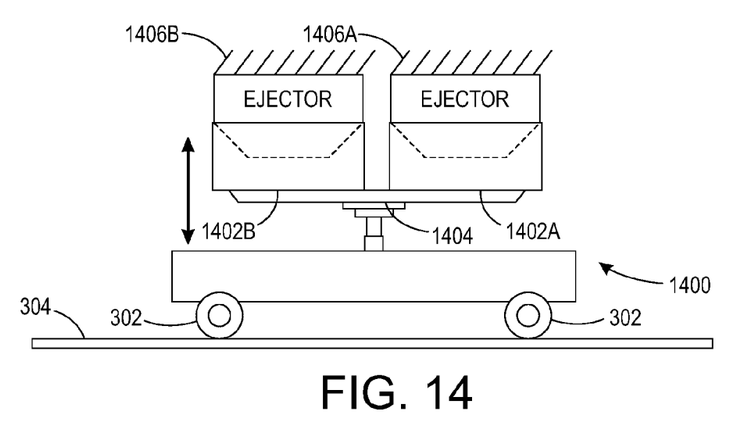
FIGS. 14 and 15 are side views of different exemplary embodiments of maintenance carts with capping members according to this disclosure.

FIG. 14 illustrates an exemplary embodiment of a platform 1400 that includes wheels 302 configured to engage with and roll along the track 304, covering members 1402a and 1402b, and an actuator 1404. The covering members 1402a and 1402b are configured to cover ejector heads 1406a and 1406b. While the platform 1400 is illustrated as including two covering members 1402a and 1402b, the reader should understand that the platform 1400 can include different numbers of covering members to comport with different numbers of ejector heads in an ejector head array.

The actuator 1404 is operatively connected to the covering members 1402a and 1402b and is configured to cover the ejector heads 1406a and 1406b with the covering members 1402a and 1402b when the platform 1400 is positioned opposite the ejector heads 1406a and 1406b. While FIG. 8 illustrates the two covering members 1402a and 1402b as being operatively connected to a single actuator 1404, other numbers of covering members can be connected to a single actuator. In one embodiment, each covering member is operatively connected to a respective actuator to enable separate ejector heads to be individually covered or uncovered. The actuator 1404 is, for example, operatively connected to the controller 212 (FIG. 2), which can be configured to operate the actuator 1404 to cover the ejector heads 1406a and 1406b during a period of time in which the ejector heads 1406a and 1406b are unused, and can further be configured to uncover the ejector heads 1406a and 1406b to enable the platform 1400 to depart from the ejector heads 1406a and 1406b. Other types of covering mechanisms are also contemplated such as, for example, a covering mechanism configured to respond to a passive actuator, a covering mechanism configured to selectively cover a particular ejector head, and other types of covering mechanisms.

Figure 15:
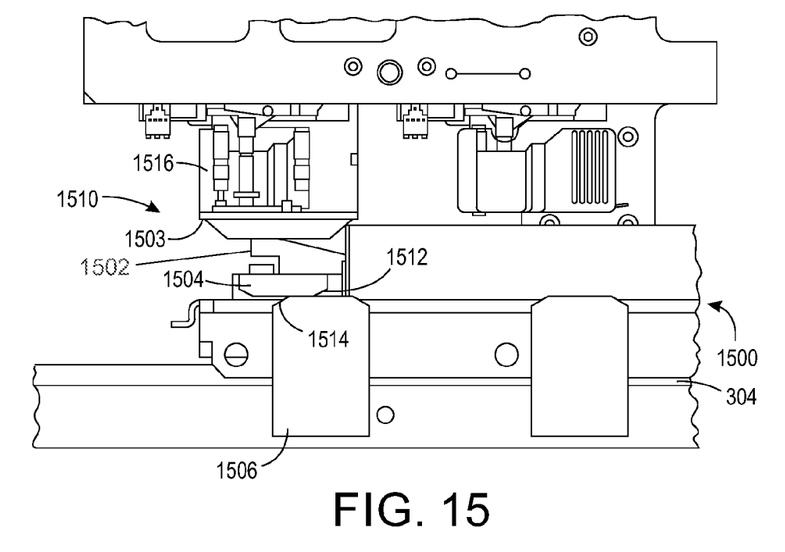

FIG. 15 illustrates another exemplary embodiment of a platform 1500 that includes a covering member holder 1502 that includes a covering member 1503 and lift wings 1504. Lift guides 1506 are positioned along the track 304. The covering member holder 1502 is configured to move normally with respect to the platform 1500. In one embodiment, the covering member holder 1502 is connected to the platform via a spring, slider, or other type of connection that enables vertical translation. Gravity acts to move the covering member holder 1502 towards a resting lowered position (not shown). In an embodiment, the covering member holder 1502 further includes a compression member (not shown) configured to hold the covering member holder 1502 in the lowered position unless a threshold amount of force is applied.

The lift wings 1504 extend laterally from each side of the platform 1500 and are configured to engage with the lift guides 1506 to enable the covering member holder 1502 to move to a raised position 1510. Advantageously, the lift wings 1504 and lift guides 1506 include complementary angled transition surfaces 1512 and 1514 respectively, which enable a smooth transition between the raised position 1510 and the lowered position. Other types of transition surfaces such as curved surfaces are also contemplated.

When the covering member holder 1502 is in the raised position 1510, the covering member 1503 is in a position that enables the covering member 1503 to cover the ejector head 1516 as the platform 1500 continues to move along the track 304. Further, when no lift guides are present along the track 304, the covering member holder 1502 remains at the lowered position so the covering member 1503 is in a position that enables the platform 1500 to continue to move along the track 304. Other types of actuators for actuating the covering members are also contemplated.

Platforms used in the disclosed systems can include other maintenance mechanisms in addition to or instead of the tray, wiper, and covering members described above. For example, a platform can include a maintenance mechanism, such as but not limited to, a blower operable to blow air over an ejector to remove contaminants, a vacuum source operable to produce a vacuum proximate to an ejector head, or an emitter configured to emit a cleaning fluid onto an ejector head.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A cart comprising:
   a platform configured to move along a track of a three-dimensional object printing system; and
   a mechanism that includes:
     a member connected to the platform, the member being configured to move bi-directionally in a direction normal to the platform;
     a tool that is operatively connected to the member to enable the tool to move with the member; and
     a lift member operatively connected to the member and extending laterally from the member connected to the tool, the lift member having a surface configured to engage with a surface of a guide member laterally offset from the track to lift the lift member from a first height to a second height to raise the member and tool a predetermined distance above the platform as the platform moves in a predetermined direction to enable the tool to perform an operation and to lower the lift member from the second height to the first height in response to the surface of the lift member disengaging from the surface of the guide member laterally offset from the track as the platform continues to move in the predetermined direction.

2. The cart of claim 1, the lift member including at least one transition portion configured to transition the lift member from the first height to the second height.

3. The cart of claim 1 further comprising:
   a tray configured to receive material ejected from an ejector head of the printing system.

4. The cart of claim 1, the tool further comprising:
   a wiper configured to wipe an ejector head of the printing system.

5. The cart of claim 4 further comprising:
   a tray configured to receive material ejected from the ejector head of the printing system; and
   a ramp configured and arranged to guide material wiped away from the ejector head by the wiper into the tray.

6. The cart of claim 1, the tool further comprising:
   a covering member that is configured to cover an ejector head of the printing system when raised by the predetermined distance to enable the covering member to cover the ejector head during a time period in which the ejector head is unused.

7. The cart of claim 6, the covering member is further configured to receive material ejected from the ejector head.

8. The cart of claim 1, the surface of the lift member further comprising:
   a first keyed portion configured not to lift the lift member in response to the first keyed portion of the lift member engaging a second keyed portion of the surface of the guide member that is complementary to the first keyed portion, and to lift the lift member in response to the first keyed portion of the lift member engaging the surface of the guide member that does not have a second keyed portion that is complementary to the first key portion of the lift member.

9. A printing system comprising:
   a track;
   an ejector head that is positioned opposite a first portion of the track, the ejector head being configured to eject material to form objects;
   at least one guide member that is laterally offset from the first portion of the track and that includes a surface raised to a predetermined height above the track;
   a cart that includes:
     a platform configured to move along the track; and
     a mechanism that includes:
       a member connected to the platform, the member being configured to move bi-directionally in a direction normal to the platform;
       a tool that is operatively connected to the member to enable the tool to move with the member; and
       at least one lift member operatively connected to the member connected to the platform and extending laterally from the member connected to the tool, the at least one lift member having a surface configured to engage with the surface of the at least one platform guide member that is laterally offset from the first portion of the track to lift the at least one lift member from a first height to a second height above the track to raise the member and tool a predetermined distance as the platform moves along the track in a first direction to enable the tool to perform an operation and to lower the at least one lift member by the predetermined distance in response to the surface of the at least one lift member disengaging the surface of the guide member as the platform continues to move in the first direction; and
   a controller that in configured to:
     move the cart along the track past the first portion of the track to enable the at least one lift member to engage with the surface of the guide member laterally offset from the track to lift the tool by the predetermined distance and to lower the at least one lift member by the predetermined distance in response to the surface of the at least one lift member disengaging the surface of the guide member as the platform continues to move in the first direction; and
     operate the tool to perform the operation.

10. The printing system of claim 9 wherein the at least one guide member is connected to a housing of the track.

11. The printing system of claim 9 further comprising:
    a gantry that houses the ejector head, and the at least one guide member is connected to the gantry.

12. The printing system of claim 9, the at least one guide member further comprising:
    an actuator configured to laterally move the at least one guide member between:
      a first lateral position where the at least one guide member is arranged to engage with the surface of the at least one lift member in response to the cart moving along the first portion of the track, and a second lateral position where the at least one guide member platform is arranged not to engage with the surface of the at least one lift member in response to the cart moving along the first portion of the track; and the controller is further configured to selectively operate the actuator to selectively enable the tool to perform the operation.

13. The printing system of claim 12, the surface of the at least one lift member further comprising:

a first keyed portion; and the at least one guide member further comprising:

a second keyed portion configured so the surface of the at least one lift member does not engage the surface of the at least one guide member when the platform moves along the rail track in the first direction past the ejector head in response to the first keyed portion of the at least one lift member being aligned with the second keyed portion of the at least one guide member; and the controller is further configured to selectively actuate the actuator to selectively align the second keyed portion of the at least one guide member with the first keyed portion of the least one lift member to selectively enable the tool to perform the maintenance operation.

14. The printing system of claim 9, the at least one lift member further comprising:

at least one transition portion configured to transition the at least one lift member between the first height and the second height above the track.

15. The printing system of claim 9, the tool further including:

a wiper configured to wipe the ejector head.

16. The printing system of claim 9, the tool further comprising:

a covering member that is configured to cover the ejector head when raised by the predetermined distance to enable the covering member to cover the ejector head during a time period in which the ejector head is unused.

17. The printing system of claim 16, the covering member being further configured to receive material ejected from the ejector head; and the controller is further configured to eject material into the covering member at regular intervals during the time period in which the ejector head is unused.

* * * * *